United States Patent
Wachter et al.

(10) Patent No.: US 9,505,297 B2
(45) Date of Patent: Nov. 29, 2016

(54) DRIVE TRAIN FOR A HYBRID MOTOR VEHICLE

(71) Applicant: Dr. Ing. h.c. F. Porsche Aktiengesellschaft, Stuttgart (DE)

(72) Inventors: Sebastian Wachter, Pressig (DE); Falk Heilfort, Eberdingen (DE)

(73) Assignee: DR. ING. H.C.F. PORSCHE AKTIENGESELLSCHAFT, Stuttgart (DE)

( * ) Notice: Subject to any disclaimer, the term of this patent is extended or adjusted under 35 U.S.C. 154(b) by 57 days.

(21) Appl. No.: 14/618,455

(22) Filed: Feb. 10, 2015

(65) Prior Publication Data

US 2015/0239335 A1    Aug. 27, 2015

(30) Foreign Application Priority Data

Feb. 24, 2014    (DE) .................. 10 2014 102 343

(51) Int. Cl.
*B60K 6/40*        (2007.10)
*B60K 6/387*       (2007.10)
(Continued)

(52) U.S. Cl.
CPC ............... *B60K 6/40* (2013.01); *B60K 6/387* (2013.01); *B60K 6/48* (2013.01); *B60K 6/547* (2013.01); *F16H 37/0806* (2013.01); *B60K 2006/4825* (2013.01); *F16H 3/006* (2013.01);
(Continued)

(58) Field of Classification Search
CPC .......... B60K 6/40; B60K 6/387; B60K 6/48; B60K 6/547; F16H 37/0806; F16H 3/006; Y02T 10/6221; Y02T 10/6252; Y02T 10/7258; Y10S 903/902
See application file for complete search history.

(56) References Cited

U.S. PATENT DOCUMENTS

| 6,093,974 A | 7/2000 | Tabata et al. |
| 2009/0105042 A1 | 4/2009 | Tanba |

(Continued)

FOREIGN PATENT DOCUMENTS

| DE | 699 25 872 | 5/2006 |
| DE | 10 2007 029 610 | 1/2009 |

(Continued)

OTHER PUBLICATIONS

Machine Translation of DE2011077590. Ulrich, Vehicle, particularly hybrid vehicle, has internal combustion engine attached in vehicle longitudinal direction, where internal combustion engine drives gear, and electric machine is arranged in area of rear axle of vehicle, Dec. 20, 2012, German PO.*

*Primary Examiner* — Erin D Bishop
*Assistant Examiner* — Lori Wu
(74) *Attorney, Agent, or Firm* — Gerald E. Hespos; Michael J. Porco; Matthew T. Hespos

(57) ABSTRACT

A drive train for a hybrid motor vehicle has an internal combustion engine (12) with a motor shaft (18) for providing a torque for driving the hybrid motor vehicle, and an electric machine (30) for providing a torque for driving the hybrid motor vehicle. The motor shaft (18) can be coupled via a transmission clutch (14) to a motor vehicle transmission (16) to shift transmission gears (1 to 8), and the motor vehicle transmission (16) has a transmission output shaft (28). A ring gear of a differential gear mechanism (29) of the hybrid motor vehicle can be driven by the transmission output shaft (28). The electric machine (30) can be coupled by a clutch (K3) to a drive shaft (60) and the ring gear (62) can be driven by the drive shaft (60).

8 Claims, 2 Drawing Sheets

(51) Int. Cl.
  *B60K 6/48*   (2007.10)
  *F16H 37/08*  (2006.01)
  *B60K 6/547*  (2007.10)
  *F16H 3/00*       (2006.01)

(52) U.S. Cl.
  CPC ........ *Y02T 10/6221* (2013.01); *Y02T 10/6252* (2013.01); *Y02T 10/7258* (2013.01); *Y10S 903/902* (2013.01)

(56) References Cited

U.S. PATENT DOCUMENTS

| | | |
|---|---|---|
| 2010/0180722 A1 | 7/2010 | Sasaki |
| 2010/0216584 A1 | 8/2010 | Lutoslawski |
| 2011/0183802 A1 | 7/2011 | Fuechtner |
| 2011/0198139 A1 | 8/2011 | Fuechtner |
| 2014/0135162 A1* | 5/2014 | Wittkopp ............... B60K 6/365 475/5 |
| 2014/0221143 A1* | 8/2014 | Garabello ............. B60K 6/387 475/5 |
| 2014/0283646 A1* | 9/2014 | Moore ................... F16H 3/089 74/661 |
| 2016/0082821 A1* | 3/2016 | Mueller ................ B60K 6/365 180/65.21 |

FOREIGN PATENT DOCUMENTS

| | | |
|---|---|---|
| DE | 10 2011 077 590 | 12/2012 |
| DE | 10 2012 214 457 | 2/2014 |
| EP | 2 093 120 | 8/2009 |
| JP | 2011246066 | 12/2011 |
| JP | 2013147048 | 8/2013 |

* cited by examiner

DRIVE TRAIN FOR A HYBRID MOTOR VEHICLE

CROSS REFERENCE TO RELATED APPLICATION

This application claims priority under 35 USC 119 to German Patent Appl. No. 10 2014 102 343.9 filed on Feb. 24, 2014, the entire disclosure of which is incorporated herein by reference.

BACKGROUND

1. Field of the Invention

The invention relates to a drive train for a hybrid motor vehicle configured to transmit a torque generated by an internal combustion engine and/or an electric machine.

2. Description of the Related Art

US 2010/0216584 A1 discloses a drive train for a hybrid motor vehicle, in which an electric machine has a rotor that is configured as an internal gear of a planetary gear mechanism. The internal gear is coupled via planetary gears that are mounted via a planetary carrier to a sun gear. The sun gear is connected fixedly to a transmission output shaft of a motor vehicle transmission and rotates with the output shaft to drive the hybrid motor vehicle electrically. The planetary carrier is connected to a shaft that is connected via a toothing system to a motor shaft of an internal combustion engine to start the internal combustion engine with the aid of the electric machine.

There is a constant need to reduce the installation space of a drive train.

It is an object of the invention to provide a drive train with a low installation space.

SUMMARY OF THE INVENTION

The invention relates to a drive train for the hybrid motor vehicle. The drive train has an internal combustion engine with a motor shaft for providing a torque to drive the hybrid motor vehicle. The drive train also has an electric machine for providing a torque for driving the hybrid motor vehicle. The motor shaft may be coupled via a transmission clutch to a motor vehicle transmission to shift transmission gears. The motor vehicle transmission has a transmission output shaft that can drive a ring gear of a differential gear mechanism of the hybrid motor vehicle. A clutch can couple the electric machine to be coupled to a drive shaft and the ring gear can be driven by means the drive shaft.

The clutch assigned to the drive shaft can be closed during operation of the electric machine so that the drive gear drives the ring gear of the differential gear mechanism. Thus, the electric machine provides a torque for driving the hybrid motor vehicle. Accordingly, the electric machine acts on the drive train directly on the output side of the motor vehicle transmission. Consequently, the attachment of the electric machine with regard to the internal combustion engine and the motor vehicle transmission can be brought about with minimum structural means and a small installation space.

The ring gear meshes with a connecting gearwheel, and the connecting gearwheel meshes with the drive shaft via a crown gear mechanism to achieve a compact design and a small installation space. The connecting gearwheel therefore represents the connection between the ring gear and the crown gear of the drive shaft. The connecting gearwheel functions as an intermediate gear and accordingly is not connected to a torque-transmitting shaft in the region of its axle.

The crown gear mechanism may have a spur gear and a crown gear. The spur gear may be connected to the drive shaft and the crown gear may be a constituent part of the connecting gearwheel that has a spur toothing system for engagement into a spur toothing system of the ring gear. The connecting gearwheel therefore functions both as the crown gear that is assigned to the electric drive and the as a spur gear. The connecting gearwheel meshes with a spur toothing system of the ring gear in the region of the spur toothing system to make a flow of torque possible between the spur gear, the connecting gearwheel and the ring gear.

An intermediate shaft may be arranged between the drive shaft and the ring gear. The intermediate shaft meshes with the drive shaft and/or with the ring gear via a crown gear mechanism.

An intermediate shaft may be provided instead of a connecting gearwheel. This design achieves an extremely space-saving arrangement possible of the elements for transmitting the movement between the electric drive and the ring gear of the differential gear mechanism. More particularly, the drive shaft may be connected to a crown gear, in relation to the drive shaft-side crown gear mechanism, and a spur gear that is connected to the intermediate shaft may mesh with the crown gear. The crown gear may be a constituent part of the ring gear, in relation to the ring gear-side crown gear mechanism, and a spur gear that is connected to the intermediate shaft may mesh with the crown gear. Assigning the crown gear mechanism to one or both ends of the intermediate shaft provides a particularly space-saving design of the drive train in the region between the clutch and the ring gear of the differential gear mechanism.

The spur gear of the above-described crown gear mechanisms may be a straight spur gear to provide a simple, inexpensive manufacturing process.

The electric machine to be coupled to the motor shaft to start the internal combustion engine. This coupling may be made via a switchable planetary gear mechanism to provide at least two different transmission ratios. An intermediate shaft that can be driven by the electric machine may be connected fixedly to a sun gear of the planetary gear mechanism so as to rotate with the sun gear. The intermediate shaft may be coupled to the drive shaft by the clutch.

An attachment of the planetary gear mechanism to the motor shaft may be a ladder chain or a roller chain, and may provide a transmission ratio that leads to stepping down of the rotational speed of the electric machine. As a result that a correspondingly great torque can be introduced in to start the internal combustion engine. A transmission ratio of, for example, 1:3 may be provided by the planetary gear mechanism for cold starting the internal combustion engine. The electric machine may not act directly on the planetary gear mechanism. Rather, a coupling may take place initially via a transmission gear mechanism to the intermediate shaft, and an additional transmission ratio can be achieved with the aid of the transmission gear mechanism. This additional transmission ratio may lead to additional stepping down of the rotational speed of the electric machine. As a result, a correspondingly high torque with a lower rotational speed can be introduced into the planetary gear mechanism. Thus, the planetary gear mechanism can be designed for lower rotational speeds and therefore lower centrifugal force loads, as a result of which the structural requirements for the planetary gear mechanism can be reduced and the manufacturing costs can be lowered. The electric machine may be arranged so that the intermediate shaft such is spaced apart from the planetary gear mechanism and the additional stepping down of the rotational speed of the electric machine can be achieved by way of the transmission gear mechanism. Thus, the electric machine can be smaller, and a drive train with a low installation space requirement is made possible.

The motor shaft of the internal combustion engine can be, for example, a crankshaft or cardan shaft that can be driven directly or indirectly by way of combustion of a fuel mixture in the internal combustion engine.

The electric machine may be coupled to at least one auxiliary assembly of the hybrid motor vehicle via an auxiliary shaft that is arranged radially with respect to the motor shaft of the electric machine. As a result, it is possible, even when the internal combustion engine is switched off, to drive auxiliary assemblies, for example oil pump, water pump, air-conditioning compressor of an air conditioning system or the like, mechanically via a belt drive with the aid of the electric machine. In addition, the internal combustion engine can have a torque output, for example a belt pulley or a chain sprocket, that is connected to the motor shaft to drive the auxiliary assemblies mechanically via the same mechanical attachment that also is used by the auxiliary shaft. The auxiliary assemblies that can be driven via the auxiliary shaft can be positioned on a side of the internal combustion engine that points away from the motor vehicle transmission, whereas coupling of the electric machine via the planetary gear mechanism to the motor shaft can be provided on a side that points toward the motor vehicle transmission. The axial spacing between the attachment to the motor shaft and an attachment to the auxiliary assemblies that takes place via the belt drive can be bridged readily by the auxiliary shaft and the intermediate shaft, preferably outside the internal combustion engine.

The electric machine preferably is positioned radially spaced apart from the internal combustion engine at an axial height of the internal combustion engine. The intermediate shaft and/or the auxiliary shaft may be positioned in the radial direction between the internal combustion engine and the electric machine. As a result, the electric machine can be positioned next to the internal combustion engine in the radial direction. Thus, it is not necessary to provide axial installation space for the electric machine between the internal combustion engine and the vehicle transmission. As a result, the axial installation space requirement of the drive train can be kept low, and can be kept length-neutral in the ideal case.

In the following text, the invention will be explained by way of example with reference to the appended drawing using two preferred exemplary embodiments. The features described in the following text represent one aspect of the invention both individually and in combination.

DETAILED DESCRIPTION

Figure 1:
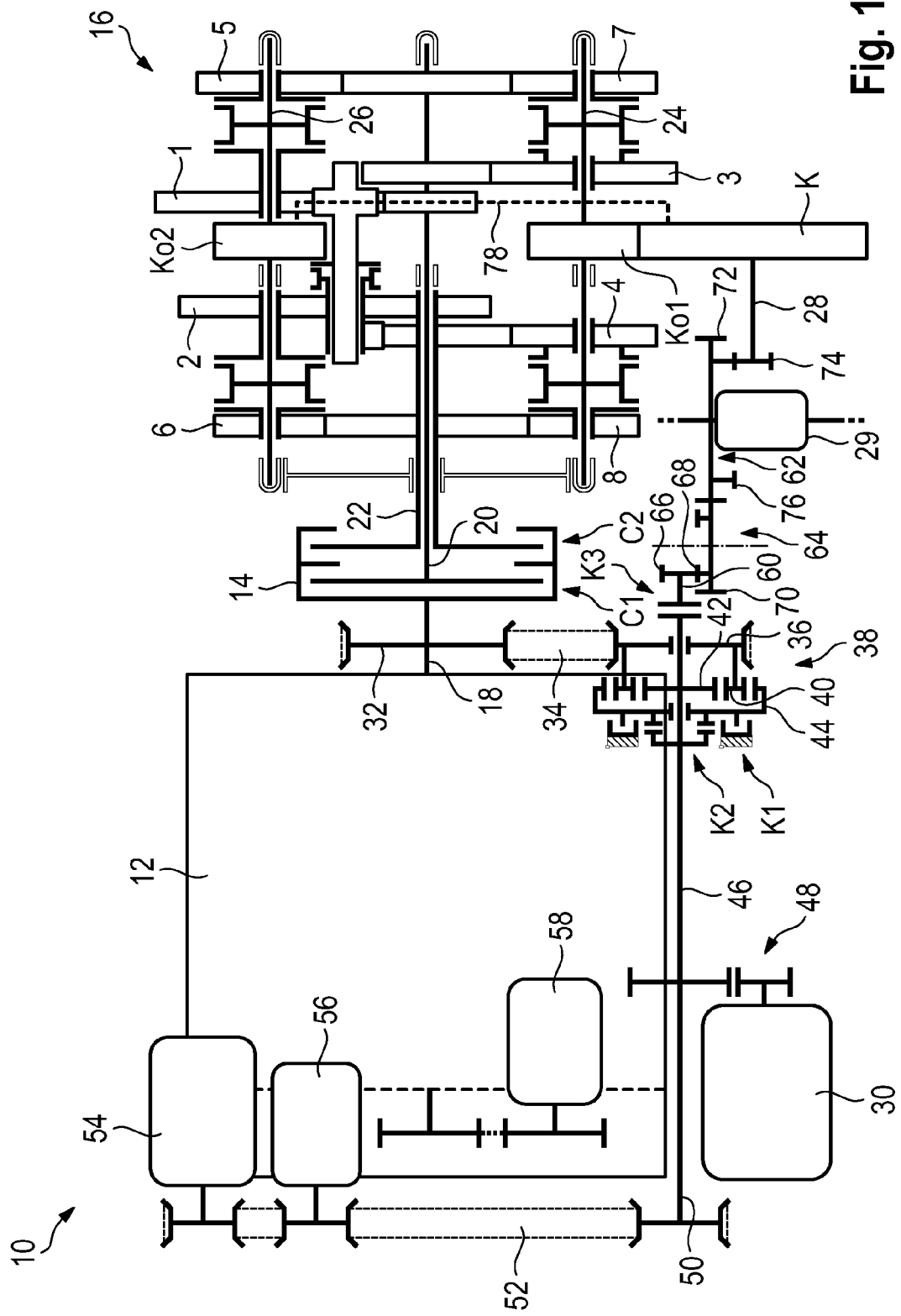
FIG. 1 shows a diagrammatic outline illustration of a first exemplary embodiment of a drive train for a hybrid motor vehicle.

FIG. 1 shows a drive train 10 for a hybrid motor vehicle. The drive train 10 of FIG. 1 has an internal combustion engine 12 that can be coupled to a motor vehicle transmission 16 via a transmission clutch 14 that preferably is a double clutch. The transmission clutch 14 has a first component clutch C1 for coupling a motor shaft 18 of the internal combustion engine 12 to a solid first transmission input shaft 20 and a second component clutch C2 for coupling the motor shaft 18 to a hollow second transmission input shaft 22. The transmission input shafts 20, 22 mesh within the motor vehicle transmission 16 via shiftable transmission stages to a first shift shaft 24 for the transmission gears 3, 4, 7 and 8 and to a second shift shaft 26 for the transmission gears 1, 2, 5 and 6. The first shift shaft 24 meshes via an output gearwheel Ko1 to an input gearwheel K of a transmission output shaft 28 which is coupled via a differential gear mechanism 29 to drive wheels (not shown) of the hybrid motor vehicle to move the hybrid motor vehicle. The second shift shaft 26 meshes via an output gearwheel Ko2 to the input gearwheel K of the transmission output shaft 28 which is coupled via the differential gear mechanism 29 to the drive wheels (not shown) of the hybrid motor vehicle to move the hybrid motor vehicle. The torque introduced into the second shift shaft 26 is guided to the input gearwheel K and the transmission output shaft 28 via a connection 78, as illustrated by the dashed line.

The internal combustion engine 12 can be started with the aid of an electric machine 30. To this end, the motor shaft 18 of the internal combustion engine 12 has a belt pulley or a chain sprocket 32 that is coupled via a first belt drive or chain drive 34 to a planetary carrier 36 of a planetary gear mechanism 38. The planetary carrier 36 mounts planetary gears 40 which mesh with a sun gear 42 and an internal gear 44. The sun gear 42 is connected to an intermediate shaft 46, with the aid of which the electric machine 30 is attached via a transmission gear mechanism 48 in a manner which is spaced apart axially from the planetary gear mechanism 38. The planetary gear mechanism 38 has a first clutch K1, with the aid of which the internal gear 44 can be held fixedly on the housing, with the result that, for example for cold starting of the internal combustion engine, a transmission ratio which is different than the 1.0 is set, by way of which the rotational speed of the intermediate shaft 46 can be changed and the corresponding torque on the motor shaft 18 can be increased. With the aid of a second clutch K2, the internal gear 44 can be connected fixedly to the intermediate shaft 46 so as to rotate with it, with the result that, for example for warm starting of the internal combustion engine 12, a transmission ratio via the planetary gear mechanism of 1.0 is set when the first clutch K1 is open.

A coaxially running auxiliary shaft 50 is connected fixedly, in particular integrally, to the intermediate shaft 46 so as to rotate with it. With the aid of the auxiliary shaft 50, auxiliary assemblies, in particular an air-conditioning compressor 54 of a vehicle air conditioning system, or a water pump 56, can be driven via a second belt drive 52 by the electric machine 30 when the internal combustion engine 12 is switched off. Furthermore, an oil pump 58 is provided which, in the exemplary embodiment which is shown, is attached to the motor shaft 18 and, as an alternative, can be driven via the second belt drive 52.

For purely electric operation of the hybrid motor vehicle, a drive shaft 60 which runs coaxially with respect to the intermediate shaft 46 can be coupled fixedly to the intermediate shaft 46 so as to rotate with it with the aid of a third clutch K3. Via the drive shaft 60, the torque of the electric machine 30 can be introduced directly into a ring gear 62 of the differential gear mechanism 29 past the transmission clutch 14 and the transmission input shafts 20, 22 and also, in the case where both the first clutch K1 and the second clutch K2 are open, also past the planetary gear mechanism 38 and the motor shaft 18. Said ring gear 62 meshes with a connecting gearwheel 64 which meshes with the drive shaft 60 via a crown gear mechanism. The crown gear mechanism has a spur gear 66 which is configured as a straight spur gear, and a crown gear 68. The spur gear 66 is connected to the drive shaft 60 and the crown gear 68 is a constituent part of the connecting gearwheel 64. The connecting gearwheel 64 has a spur toothing system 70 for engagement with a spur toothing system 72 of the ring gear 62.

The transmission of torque between the transmission output shaft 28 and the ring gear 62 likewise takes place via a crown gear mechanism. The latter has a spur gear 74 and a crown gear 76. The spur gear 74 is configured as a straight spur gear and is connected to the transmission output shaft 28. The crown gear 76 is a constituent part of the ring gear 62.

For partial starting of the internal combustion engine 12, the first clutch K1 can be closed, whereas the second clutch K2 and the third clutch K3 are open, with the result that cold starting with a high torque requirement can take place by way of the additional transmission ratio of the planetary gear mechanism 38 and at the same time the auxiliary assemblies 54, 56 can be driven. After starting of the internal combustion engine 12, the electric machine 30 can be operated as a motor in this position of the clutches K1, K2, K3, in order to exert a boost and/or assist function as a result of the additional input of performance, it being possible for an additional transmission ratio to be provided by way of the planetary gear mechanism 38. The electric machine 30 can also be operated as a generator, with the result that part of the performance of the internal combustion engine 12 can be introduced into the electric machine 30, for example in order to charge a motor vehicle battery, an additional transmission ratio being provided by way of the planetary gear mechanism 38. In this case, the auxiliary assemblies 54, 56 are driven by the internal combustion engine 12 via the intermediate shaft 46 and the auxiliary shaft 50.

If the first clutch K1 and the third clutch K3 are open, whereas the second clutch K2 is closed, a transmission ratio of 1.0 is set in the planetary gear mechanism 38, in the case of which transmission ratio, in particular, warm starting of the internal combustion engine 12 can take place. After starting of the internal combustion engine 12, the electric machine 30 can be operated as a motor in this position of the clutches K1, K2, K3, in order to exert a boost and/or assist function as a result of the additional input of performance, no additional transmission ratio being provided in this case by way of the planetary gear mechanism 38. The electric machine 30 can also be operated as a generator, with the result that part of the performance of the internal combustion engine 12 can be introduced into the electric machine 30, no additional transmission ratio being provided in this case by way of the planetary gear mechanism 38. In this case, the auxiliary assemblies 54, 56 are driven by the internal combustion engine 12 via the intermediate shaft 46 and the auxiliary shaft 50.

For purely electric operation, the first clutch K1 and the second clutch K2 are open, whereas the third clutch K3 is closed. As a consequence, the electric machine 30 drives the ring gear 62 of the differential gear mechanism 29 directly. The internal combustion engine 12 is switched off in purely electric operation and can be started simply during electric operation by the first clutch K1 or the second clutch K2 being closed. Here, the third clutch K3 can remain closed until the internal combustion engine 12 is started and/or the transmission clutch 14 is to be closed. If the first clutch K1, the second clutch K2 and the third clutch K3 are open, a flow of power from the electric machine 30 to the motor shaft 18 and to the ring gear 62 of the differential gear mechanism 29 is interrupted, with the result that the auxiliary assemblies 54, 56 can be driven by the electric machine 30 even when the internal combustion engine 12 is switched off.

The auxiliary assemblies 54, 56 can therefore be operated independently of the rotational speed of the internal combustion engine. At low rotational speeds, the auxiliary assemblies can therefore rotate more quickly than the engine, and at high rotational speeds they can rotate more slowly than the engine. This can have positive effects on the design of the auxiliary assemblies and/or on the degree of efficiency thereof. In addition, recuperative operation is possible, by the flow of force being guided from a wheel of the hybrid motor vehicle via the ring gear 62 to the electric machine 30, bypassing the motor vehicle transmission 16.

Figure 2:
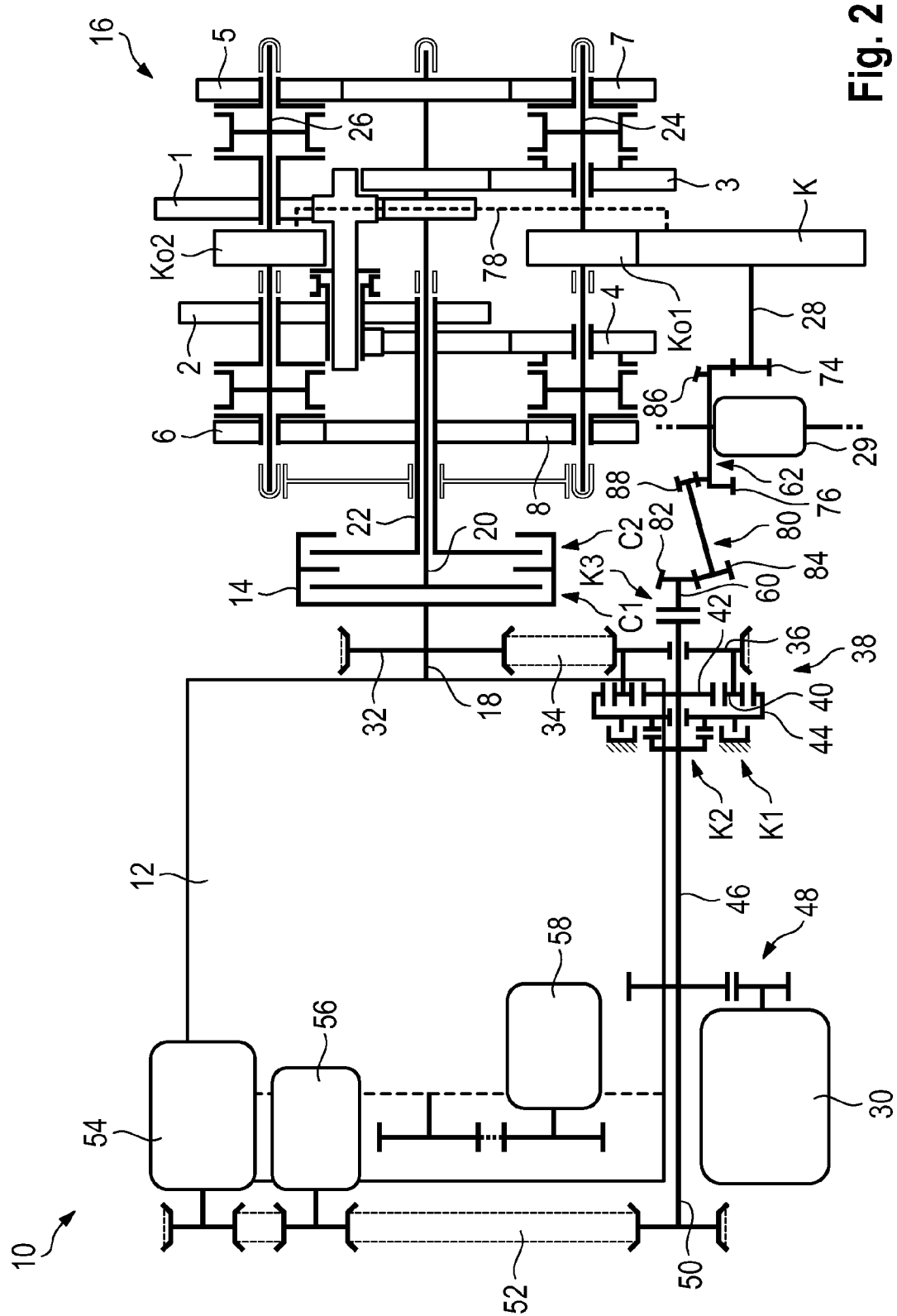
FIG. 2 shows a diagrammatic outline illustration of a second exemplary embodiment of a drive train for a hybrid motor vehicle.

The second exemplary embodiment according to the illustration in FIG. 2 differs from that according to FIG. 1 only as a result of the attachment of the drive shaft 60 to the ring gear 62. To this extent, identical elements are denoted by identical designations for both embodiments of the drive train and reference is made to the above-described description with respect to FIG. 1 with regard to the method of operation of the drive train according to FIG. 2.

In the exemplary embodiment according to FIG. 2, an intermediate shaft 80 is arranged between the drive shaft 60 and the ring gear 62. Said intermediate shaft 80 meshes with the drive shaft 60 and with the ring gear 62, in each case via a crown gear mechanism. Here, the drive shaft 60 is connected to a crown gear 82 and a spur gear 84 which is configured as a straight spur gear and is connected to the intermediate shaft 80 meshes with the crown gear 82. A crown gear 86 is a constituent part of the ring gear 62. A spur gear 88 which is configured as a straight spur gear and is connected to the intermediate shaft 80 meshes with said crown gear 86.

What is claimed is:

1. A drive train for a hybrid motor vehicle, the drive train comprising: an internal combustion engine with a motor shaft for providing a first torque for driving the hybrid motor vehicle; an electric machine for providing a second torque for driving the hybrid motor vehicle; a transmission clutch selectively coupling the motor shaft to a motor vehicle transmission to shift transmission gears, the motor vehicle transmission having a transmission output shaft that drives a ring gear of a differential gear mechanism of the hybrid motor vehicle, the ring gear having a spur toothing system; a clutch selectively coupling the electric machine to a drive shaft, the drive shaft having a spur gear; and a connecting gearwheel having a crown gear that meshes with the spur gear of the drive shaft, the connecting gearwheel further having a spur toothing system that meshes with the spur toothing system of the ring gear for driving the ring gear.

2. The drive train of claim 1, wherein the electric machine is coupled selectively to the motor shaft of the internal combustion engine to start the internal combustion engine, via a switchable planetary gear mechanism to provide at least two different transmission ratios, an intermediate shaft that can be driven by the electric machine being connected fixedly to a sun gear of the planetary gear mechanism to rotate with the sun gear, and the clutch selectively couples the intermediate shaft to the drive shaft.

3. The drive train of claim 1, further comprising an auxiliary shaft arranged radially with respect to a motor shaft of the electric machine and selectively coupling the electric machine to at least one auxiliary assembly of the hybrid vehicle.

4. The drive train of claim 3, wherein the electric machine is positioned radially spaced apart from the internal combustion engine at an axial height of the internal combustion engine.

5. The drive train of claim 4, wherein at least one of the intermediate shaft and the auxiliary shaft are positioned in a radial direction between the internal combustion engine and the electric machine.

6. A drive train for a hybrid motor vehicle, the drive train comprising: an internal combustion engine with a motor shaft for providing a first torque for driving the hybrid motor vehicle; an electric machine for providing a second torque for driving the hybrid motor vehicle; a transmission clutch selectively coupling the motor shaft to a motor vehicle transmission to shift transmission gears, the motor vehicle transmission having a transmission output shaft with a spur gear; a differential gear mechanism with a ring gear, the ring gear having a first crown gear that is driven by the spur gear of the transmission output shaft, the ring gear further having a second crown gear; a clutch selectively coupling the electric machine to a drive shaft; an intermediate shaft between the drive shaft and the ring gear, the intermediate shaft meshing with the drive shaft and with the second crown gear of the ring gear.

7. The drive train of claim 6, wherein the drive shaft is connected to a crown gear that rotates integrally with the drive shaft, and the intermediate shaft has a first spur gear that rotates integrally therewith, the first spur gear of the intermediate shaft meshing with the crown gear of the drive shaft.

8. The drive train of claim 7, wherein the intermediate shaft has a second spur gear meshing with the second crown gear of the ring gear.

* * * * *